United States Patent
Tomiyama et al.

(10) Patent No.: US 7,462,342 B2
(45) Date of Patent: Dec. 9, 2008

(54) METHOD FOR PRODUCING BASIC METAL NITRATE

(75) Inventors: Shogo Tomiyama, Hyogo (JP); Xingxi Zhou, Hyogo (JP)

(73) Assignee: Daicel Chemical Industries, Ltd., Sakai-Shi (JP)

( * ) Notice: Subject to any disclaimer, the term of this patent is extended or adjusted under 35 U.S.C. 154(b) by 772 days.

(21) Appl. No.: 10/468,039

(22) PCT Filed: Mar. 27, 2002

(86) PCT No.: PCT/JP02/03005

§ 371 (c)(1),
(2), (4) Date: Feb. 17, 2004

(87) PCT Pub. No.: WO02/079091

PCT Pub. Date: Oct. 10, 2002

(65) Prior Publication Data

US 2004/0131529 A1    Jul. 8, 2004

(30) Foreign Application Priority Data

Mar. 29, 2001  (JP) .............................. 2001-094976

(51) Int. Cl.
*C01B 21/48* (2006.01)
(52) U.S. Cl. ..................................................... 423/395
(58) Field of Classification Search .................. 423/395
See application file for complete search history.

(56) References Cited

U.S. PATENT DOCUMENTS

| | | | | |
|---|---|---|---|---|
| 3,983,221 A | * | 9/1976 | Rademachers et al. | 423/395 |
| 4,136,157 A | * | 1/1979 | Asai et al. | 423/395 |
| 5,000,928 A | * | 3/1991 | White | 423/34 |
| 5,039,502 A | * | 8/1991 | Horn et al. | 423/395 |
| 5,429,691 A | * | 7/1995 | Hinshaw et al. | 149/45 |
| 6,468,494 B2 | * | 10/2002 | Nappier et al. | 423/395 |
| 2007/0119530 A1 | | 5/2007 | Zhou et al. | |

FOREIGN PATENT DOCUMENTS

EP        1 241 138 A1    9/2002

(Continued)

OTHER PUBLICATIONS

Gmelins Handbuch Deranorganischen chemie "kuper" Teil B, pp. 188-193, 1958 (corresponds to specification p. 1, line 10, no month.

(Continued)

*Primary Examiner*—Wayne Langel
(74) *Attorney, Agent, or Firm*—Birch, Stewart, Kolasch & Birch, LLP

(57) ABSTRACT

A process in which a basic metal nitrate is obtained in a high yield is provided.

A process for producing a basic metal nitrate, which comprises adding an aqueous solution of a metal nitrate or an aqueous solution of a mixture of a metal nitrate and a water-soluble additive and an alkali solution to a reaction vessel in which a reaction solvent whose pH at 20° C. is adjusted to 6 or less is present, and conducting the reaction with stirring.

12 Claims, 2 Drawing Sheets

FOREIGN PATENT DOCUMENTS

| | | | | |
|---|---|---|---|---|
| JP | 57-209822 | * | 12/1982 | ................ 423/395 |
| JP | 60-200825 A | | 10/1985 | |
| JP | 02-145422 A | | 6/1990 | |
| JP | 02-204321 A | | 8/1990 | |
| JP | 07-187673 A | | 7/1995 | |

OTHER PUBLICATIONS

Acta Chemica Scandinavia A 30, No. 5, 343-350 (corresponds to specification at p. 2, line 2, no date.

Aust. J. Chem., 1990, 42, pp. 749-754 (corresponds to specification at p. 2, line 9, no month.

* cited by examiner

METHOD FOR PRODUCING BASIC METAL NITRATE

This application is the national phase under 35 U.S.C. 371 of PCT International Application No. PCT/JPO2/03005 which has an International filing date of Mar. 27, 2002, which designated the United States of America.

TECHNICAL FIELD TO WHICH THE INVENTION BELONGS

The present invention relates to a process for producing a basic metal nitrate.

PRIOR ART

With respect to a process for producing a basic metal nitrate, various processes have been so far known. For example, as a process for producing a basic copper nitrate using a copper nitrate solution, a process described in GME-LINS HANDBUCH DERANORGANISCHEN CHEMIE "KUPFER" Teil B, pp. 188-193 (System Number 60), 1958; VERLAG CHEMIE, GMBH., WEINHEIM/BERG-STRASSE is known. In this literature, a process using a copper nitrate solution and ammonia or an alkali hydroxide, a reaction of a dilute copper nitrate aqueous solution with a 0.1 N sodium hydroxide aqueous solution, a reaction of a neutral copper nitrate solution with a sodium hydroxide aqueous solution, a reaction with ammonium nitrate in the presence of air and water and the like are described as a process for producing a basic copper nitrate. However, in all of these processes, a yield of a basic copper nitrate is unclear, and further a color and a crystalline state of the resulting basic copper nitrate are not fixed. Thus, it is difficult to utilize the same industrially.

Acta Chemica Scandinavia A 30 No. 5 343-350 (1976) describes a process with a copper nitrate solution—ammonium nitrate solution—aqueous ammonia system. However, although the production is conducted using a 4-liter flask in this process, an amount is as small as 5 g. When this is calculated on a plant scale, the yield is as low as approximately 53%. Thus, it is difficult to utilize the same industrially.

In Aust. J. Chem., 1990, 43, 749-754, it is described that when a $10^{-1}$ M potassium hydroxide solution is gradually added to a solution in which a concentration of a divalent copper ion in a copper nitrate solution is $10^{-4}$ or $10^{-3}$ M and a concentration of a nitrate anion by potassium nitrate is $10^{-3}$, $10^{-2}$ or $10^{-1}$ M, a pH value at the initial stage of the solution is adjusted to approximately 3. This process is, however, problematic in that since it includes a step of using a dilute solution, a production time is more than approximately 36 hours and too long.

DISCLOSURE OF THE INVENTION

The object of the invention is to provide a process for producing a basic metal nitrate in which a high-quality basic metal nitrate is obtained in a high yield and at good efficiency, and to provide a basic metal nitrate which is composed in accordance with the above process.

The invention provides, as a means for solving the problem, a process for producing a basic metal nitrate, which comprises adding an aqueous solution of a metal nitrate or an aqueous solution of a mixture of a metal nitrate and a water-soluble additive and an aqueous solution of an alkali to a reaction vessel in which a reaction solvent whose pH (20° C.) before starting a reaction is adjusted to between 1.5 and 2.5 is present, and conducting the reaction with stirring through a stirring unit so that the maximum pH value reaches 5.0 to 6.5 during the reaction.

The pH is determined depending on various factors to be described below, and is adjusted by properly selecting the respective factors.

The basic metal nitrate obtained by the process of the invention includes compounds represented by the following general formula (I), and some compounds contain hydrates too.

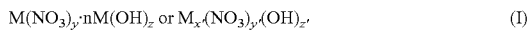

$$M(NO_3)_y \cdot nM(OH)_z \text{ or } M_{x'}(NO_3)_{y'}(OH)_{z'} \quad (I)$$

[wherein M represents a metal, x' represents the number of metals, y and y' each represent the number of $NO_3$ ions, z' represents the number of OH ions, and n represents a ratio of an $M(OH)_z$ moiety to an $M(NO_3)_y$ moiety.]

Examples of the compounds corresponding to the general formula (I) include those containing, as a metal M, copper, cobalt, zinc, manganese, iron, molybdenum, bismuth and cerium, such as basic copper nitrates [$Cu_2(NO_3)(OH)_3$ and $Cu_3(NO_3)(OH)_5 \cdot 2H_2O$], basic cobalt nitrate [$CO_2(NO_3)(OH)_3$], basic zinc nitrate [$Zn_2(NO_3)(OH)_3$], basic manganese nitrate [$Mn(NO_3)(OH)_2$], basic iron nitrate [$Fe_4(NO_3)(OH)_{11} \cdot 2H_2O$], basic molybdenum nitrate, basic bismuth nitrate [$Bi(NO_3)(OH)_2$] and basic cerium nitrate [$Ce(NO_3)_3(OH) \cdot 3H_2O$]. Of these, basic copper nitrates (BCN) are preferable.

According to the process of the invention, a basic metal nitrate such as a basic copper nitrate or the like can industrially be produced using a starting material which is less costly and can be procured industrially easily without the special need of a special reaction equipment and under readily controllable reaction conditions. Further, a basic metal nitrate in fixed crystal form having a uniform particle diameter (narrow particle size distribution) can be obtained in a high yield.

Moreover, when the basic metal nitrate obtained by the process of the invention is used as an oxidizing agent of a gas generating agent for an inflator, a burning rate of the gas generating agent can be adjusted to a preferable range.

MODE FOR CARRYING OUT THE INVENTION

Figure 1:
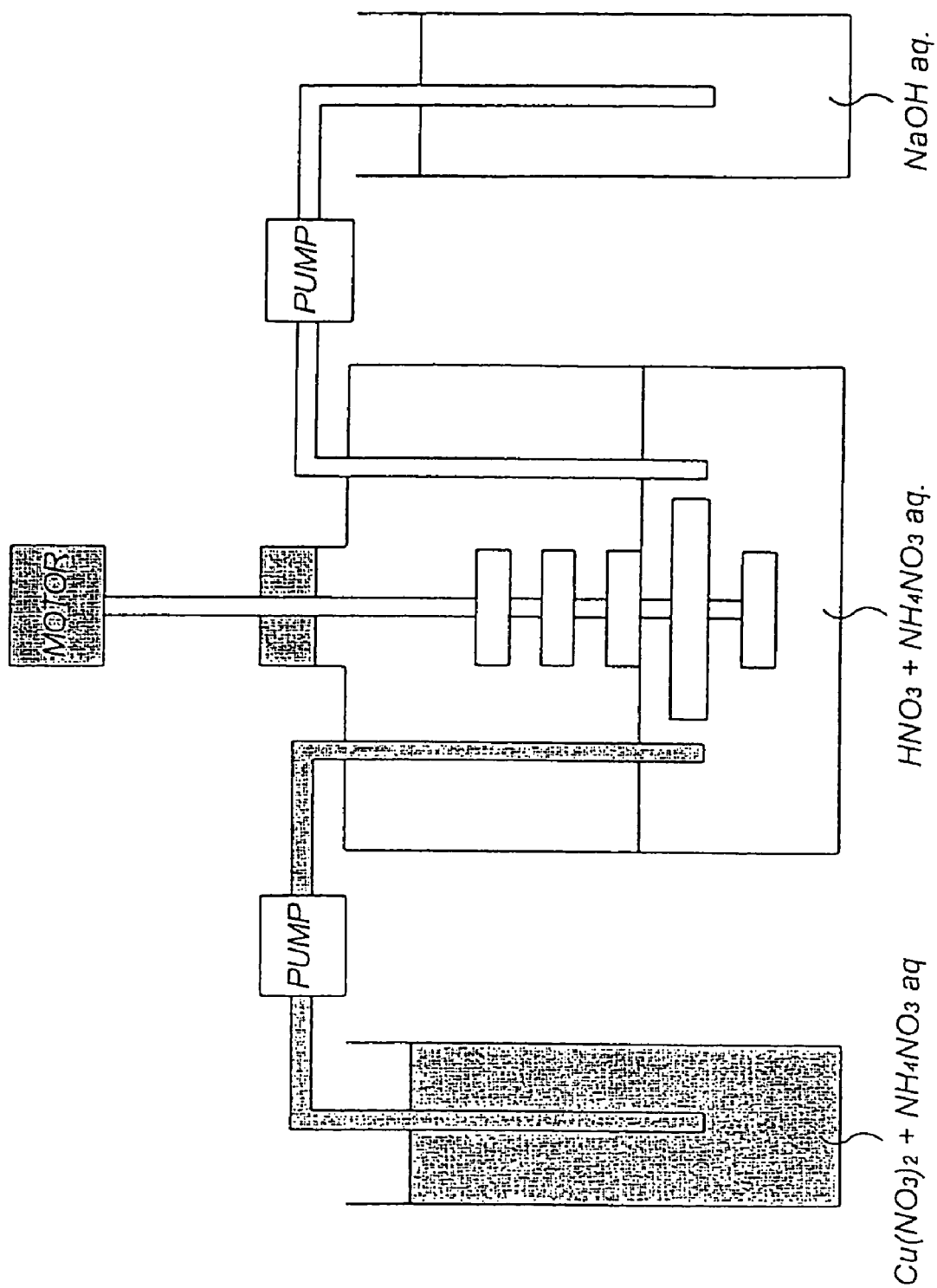
FIG. 1 is a conceptual view for describing a process of the invention.

One embodiment of the process of the invention is described below according to production steps. However, the following production steps can undergo changes and additions, as required, by modifications which are commonly conducted by those skilled in the art.

First, an aqueous solution of a metal nitrate or an aqueous solution of a mixture of a metal nitrate and a water-soluble additive which is a reaction starting material and an aqueous solution of an alkali are prepared.

The metal nitrate is preferably a metal salt of at least one metal selected from cobalt, copper, zinc, manganese, iron, molybdenum, bismuth and cerium. Copper nitrate is more preferable.

The water-soluble additive is at least one selected from ammonium nitrate, ammonium nitrite, ammonium acetate, ammonium carbonate, ammonium bicarbonate, ammonium sulfate, ammonium sulfite, ammonium bisulfate, ammonium bisulfite, ammonium hydrogensulfate, ammonium hydrogensulfite, ammonium borate 8-hydrate, ammonium tetraborate, diammonium phosphate, monoammonium phosphate, triammonium phosphate 3-hydrate, ammonium sodium hydrogenphosphate 4-hydrate, ammonium perchlorate, ammonium perrhenate, ammonium cerium (IV) nitrate, ammonium cerium (III) nitrate 4-hydrate, cerium ammonium (IV) sulfate 2-hydrate, ammonium chromium (III) sulfate 12-hydrate, ammonium cobalt (II) sulfate 6-hydrate, ammonium iron (II) sulfate 6-hydrate, ammonium iron (III) sulfate 12-hydrate, ammonium chromate, ammonium dichromate, ammonium molybdate 4-hydrate, ammoniumvanadate (V), ammonium phosphomolybdate 3-hydrate, ammonium phosphotungstate 3-hydrate, manganese (II) ammonium sulfate, nickel (II) ammonium sulfate 6-hydrate, nickel (II) ammonium sulfate 6-hydrate, ammonium chloride, ammonium bromide, ammonium iodide, ammonium acetate, ammonium adipate, ammonium alginate, ammonium benzoate, ammonium dicitrate, triammonium citrate, ammonium iron (III) citrate, ammonium formate, ammonium tartrate, ammonium hydrogentartrate, ammonium lactate, ammonium methacrylsulfonate, ammonium phthalate, ammonium salicylate, ammonium succinate and ammonium sulfamate. Of these, ammonium nitrate is preferable.

The concentration of the metal nitrate in the aqueous solution or the aqueous solution of the mixture is preferably 65% by weight or less, more preferably 40 to 55% by weight. When the concentration of the metal nitrate is too high, crystals of the metal nitrate are precipitated to make difficult the procedure of charging into a reaction vessel and to increase the pH of the reaction system. Thus, it is undesirable.

The concentration of the water-soluble additive is preferably 5% by weight or less, more preferably 0.01 to 1.5% by weight. When the concentration of the water-soluble additive is too high, excess ammonium ion is coordinated in a metallic ion of a metal nitrate, and is stabilized as a complex ion, interrupting the production of a basic metal nitrate. Thus, it is undesirable.

As the alkali, alkali metal salt hydroxides such as sodium hydroxide, potassium hydroxide, lithium hydroxide and the like are preferable, and sodium hydroxide is more preferable.

The alkali concentration in the aqueous solution of an alkali is preferably 60% by weight or less, more preferably 20 to 50% by weight. When the alkali concentration is too high, crystals of the alkali are precipitated to make difficult the procedure of charging into a reaction vessel and to increase the pH of the reaction system. Thus, it is undesirable.

With respect to the mixing ratio of the metal nitrate and the alkali, the alkali is preferably 2 mols or less, more preferably in the range of 1.0 to 1.7 mols per one mol of the metal nitrate. When the alkali is less than this range, the quality of the basic metal nitrate is not improved, and the yield is decreased. Thus, it is meaningless as an industrial process. Further, when it is more than this range, the metal hydroxide is incorporated into the basic metal nitrate. It is therefore undesirable.

Subsequently, the aqueous solution of a metal nitrate or the aqueous solution of the mixture of the metal nitrate and the water-soluble additive and the alkali solution are added to a reaction vessel in which the reaction solvent is present, and the mixture is reacted with stirring through a stirring unit.

A ratio $S_1/S_2$ of an addition rate $S_1$ (mol/min) of the metal nitrate to an addition rate $S_2$ (mol/min) of the alkali is preferably 0.2 to 3.0, more preferably 0.4 to 0.9. When this ratio $S_1/S_2$ is too low, the pH is abruptly increased in the reaction, and a gel-like metal hydroxide is formed, making it difficult to continue the stirring. Thus, it is undesirable. When this ratio $S_1/S_2$ is too high, the reaction system cannot be rendered uniform. Thus, it is undesirable.

The pH at 20° C. of the reaction solvent before starting the reaction is 1.5 to 2.5, preferably 1.8 to 2.2. When the pH before starting the reaction is too high, the pH is abruptly increased in the reaction, and a gel-like metal hydroxide is formed, making it difficult to continue the stirring. Thus, it is undesirable. When the pH in the start-up of the reaction is too low, the pH of the reaction system is not satisfactorily increased during the reaction, and the resulting basic metal nitrate becomes a non-uniform agglomerate. Thus, it is undesirable.

The reaction solvent is preferably an acid aqueous solution or an aqueous solution of a mixture of an acid and a water-soluble additive. A nitric acid aqueous solution or an aqueous solution of a mixture of nitric acid and ammonium nitrate is more preferable. At this time, the concentration of the water-soluble additive is preferably 5% by weight or less, more preferably 0.1 to 3% by weight. When the concentration of the water-soluble additive is too high, excess ammonia generated in the reaction solution is coordinated in a metallic ion, and is stabilized as a complex ion as such to increase the pH. Accordingly, a basic metal nitrate is not obtained.

The stirring unit used in the stirring is preferably one having stirring blades which are mounted separately at plural stages in the lengthwise direction in view of the uniform stirring of the reaction system.

The aqueous solution of a metal nitrate or the aqueous solution of the mixture of the metal nitrate and the water-soluble additive and the alkali solution are added to the reaction vessel with stirring through the stirring unit. A position where these are added is preferably closer to or next to the stirring blades in the solution, especially preferably in the vicinity of or next to the stirring blade at the lower stage in the solution in order that the stirring of the reaction solution is conducted more uniformly in using the stirring blades as the stirring unit.

The reaction is conducted so that the maximum pH value reaches 5.0 to 6.5. The maximum pH value is preferably 5.5 to 6.2.

The reaction temperature is preferably 60° C. or less, more preferably 10 to 50° C. When the temperature is too high, the basic metal nitrate formed causes a dehydrocondensation reaction with heat, and is converted into a metal hydroxide. Thus, it is undesirable.

The stirring rate in the reaction is preferably less than 200 rpm, more preferably 10 to 150 rpm, further preferably 90 to 110 rpm. When the stirring rate is too high, the maximum pH value in the reaction becomes too high, and the resulting basic metal nitrate is a spherical agglomerate having a broad particle size distribution. Thus, it is undesirable.

The reaction time is preferably 20 to 100 hours, more preferably 10 to 40 hours.

The basic metal nitrate obtained by the invention can be used as an oxidizing agent of a gas generating agent. In this case, a burning rate of the gas generating agent can easily be adjusted as compared with the use of other oxidizing agents. Further, the gas generating agent can be used in, for example, an inflator for an air bag of a driver side, an inflator for an air bag of a passenger side, an inflator for a side air bag, an inflator for an inflatable curtain, an inflator for a knee bolster, an inflator for an inflatable seat belt, an inflator for a tubular system and a gas generator for a pretensioner in various vehicles.

EXAMPLES

The invention is illustrated more specifically below by referring to Examples. However, the invention is not limited thereto. The test methods in the following Examples are described below.

(1) Identification of a Particle Diameter and a Particle Form

A sample powder was fixed on an exclusive sample base. A particle diameter of the sample powder in visual images for observation of x500, x2,000 and x10,000 was measured using a scanning electron microscope, and a particle form was estimated at the same time. Incidentally, when particles were particles in the form of needles, a length was defined as a particle diameter. When particles were particles in the form of rods (prisms) or plates, a maximum diagonal length was defined as a particle diameter. Further, when particles were particles in the form of shapes similar to spheres, a major axis was defined as a particle diameter.

(2) Burning Rate (mm/sec)

15 parts by weight of deionized water was added to a total of 100 parts by weight, namely, 52 parts by weight of a basic copper nitrate, 45 parts by weight of nitroguanidine and 3 parts by weight of guar gum, and these were fully mixed. The mixture was then molded into a cylinder having a diameter of approximately 9.6 mm and a height of approximately 12.7 mm. This molded product was dried at 80° C. for 16 hours, and the cylindrical molded product was burned from its end surface in a nitrogen atmosphere under a gauge pressure of 70 $kg/cm^2$. The rate at this time was read out from the change in pressure with time, and defined as a burning rate.

Example 1

As shown in FIG. 1, a basic copper nitrate was produced using a 5-liter reaction vessel fitted with a stirring unit comprising a total of 5 stages of cross blades (the length of the cross blade at the fourth stage from the top is approximately 1.5 times that of the other cross blades which are of the same length). Incidentally, 1 liter of a 0.5% by weight of ammonium nitrate aqueous solution whose pH at 20° C. had been adjusted to 2.23 with nitric acid was charged into the reaction vessel as a reaction solvent.

First, while the reaction solvent was stirred at 95 rpm by actuating the stirring blades, 6,000 parts by weight of copper nitrate 3-hydrate and 66 parts by weight of ammonium nitrate were added to 2,800 parts by weight of deionized water so that copper nitrate 3-hydrate reached 18% by weight calculated as copper and ammonium nitrate 0.75% by weight respectively. While the mixed aqueous solution (the concentration of copper nitrate in the aqueous solution was 53% by weight) was added to the reaction vessel at a rate of 2.6 ml/min, a 30% by weight of sodium hydroxide aqueous solution was added to the reaction vessel at a rate of 1.8 ml/min at the same time. At this time, the mixture and the aqueous solution of an alkali were added to a position near the stirring blade at the fourth stage as shown.

The reaction was conducted under conditions that the stirring rate was 95 rpm and the reaction temperature was 40° C. Approximately 21 hours later, the reaction was terminated. The resulting precipitate was filtered at room temperature, and washed with distilled water. The product was dried under normal pressure at 80° C. for 16 hours to obtain a basic copper nitrate. The resulting basic copper nitrate was weakly agglomerated, primary particles were in the form of bluish green rods (prisms), and a primary particle diameter was 0.5 to 3 μm. The yield based on the charged starting material was 96%.

Figure 2:
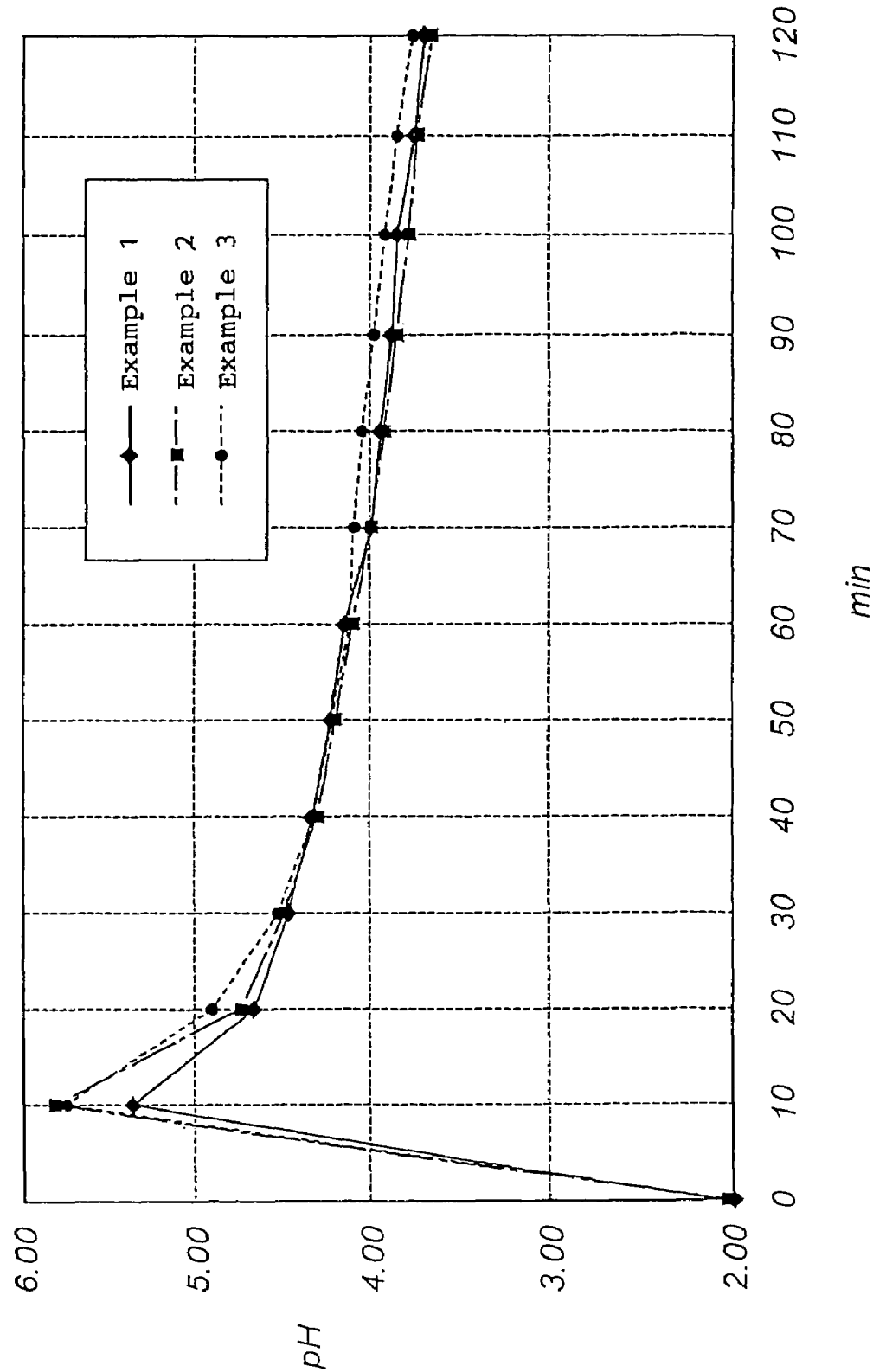
FIG. 2 is a graph showing a change in pH of a reaction system with time.

By the way, the maximum pH value of the reaction system at the initial stage of the reaction was 5.72. As the reaction proceeded, the pH was decreased, and reached 3.85 after approximately 2 hours. The change in pH of the reaction system with time from 0 to 120 minutes is shown in FIG. 2.

Example 2

A basic copper nitrate was produced in the same manner as in Example 1, provided the pH of the reaction solvent before starting the reaction was 1.97 and the reaction time was approximately 24 hours. The resulting basic copper nitrate was weakly agglomerated, primary particles were in the form of bluish green rods (prisms), and a primary particle diameter was 0.5 to 3 μm. The yield based on the charged starting material was 99%. By the way, the maximum pH value of the reaction system at the initial stage of the reaction was 5.90. As the reaction proceeded, the pH was decreased, and reached 3.72 after approximately 2 hours. The change in pH of the reaction system with time from 0 to 120 minutes is shown in FIG. 2.

Example 3

A basic copper nitrate was produced in the same manner as in Example 1, provided the pH of the reaction solvent before starting the reaction was 2.05 and the reaction time was approximately 24 hours. The resulting basic copper nitrate was weakly agglomerated, primary particles were in the form of bluish green rods (prisms), and a primary particle diameter was 0.5 to 3 μm. The yield based on the charged starting material was 100%.

By the way, the maximum pH value of the reaction system at the initial stage of the reaction was 5.72. As the reaction proceeded, the pH was decreased, and reached 3.85 after approximately 2 hours. The change in pH of the reaction system with time from 0 to 120 minutes is shown in FIG. 2.

Example 4

A basic copper nitrate was produced in the same manner as in Example 1, provided the pH of the reaction solvent (before starting the reaction) was 2.04 and the reaction time was approximately 27 hours. The resulting basic copper nitrate was weakly agglomerated, primary particles were in the form of bluish green rods (prisms), and a primary particle diameter was 0.5 to 3 μm. The yield based on the charged starting material was 99%. By the way, the maximum pH value of the reaction system at the initial stage of the reaction was 5.84. As the reaction proceeded, the pH was decreased, and reached 3.63 after approximately 2 hours.

Example 5

A basic copper nitrate was produced in the same manner as in Example 1, provided the pH of the reaction solvent before starting the reaction was 1.84, the addition rate of the aqueous solution of the mixture of copper nitrate and ammonium nitrate and the addition rate of 30% by weight sodium hydroxide which were the same as in Example 1 were both 1.7 ml/min, the stirring rate was 97 rpm and the reaction time was 11 hours. The resulting basic copper nitrate was not agglomerated, particles were in the form of bluish green rods (prisms), and a particle diameter was 1.0 to 3.0 μm. The yield based on the charged starting material was 98%.

By the way, the maximum pH value of the reaction system at the initial stage of the reaction was 5.74. As the reaction proceeded, the pH was decreased, and reached 3.76 after approximately 2 hours.

Example 6

The production was conducted in the same manner as in Example 1 except that the reaction temperature was 20° C. and the pH before starting the reaction was 1.96 to obtain a basic copper nitrate. The resulting basic copper nitrate was weakly agglomerated, primary particles were in the form of bluish green rods (prisms) and partially in the form of plates, and a primary particle diameter was 0.5 to 2.0 μm. The yield based on the charged starting material was 95%.

By the way, the maximum pH value of the reaction system at the initial stage of the reaction was 6.04. As the reaction proceeded, the pH was decreased, and reached 4.47 after approximately 2 hours.

Example 7

The production was conducted in the same manner as in Example 1 except that ammonium nitrate was not added to the aqueous solution of copper nitrate and the reaction solvent and the pH before starting the reaction was 1.88 to obtain a basic copper nitrate. The resulting basic copper nitrate was not agglomerated, and was in the form of bluish green rods (prisms), and a particle diameter was 1.0 to 3.0 μm. The yield based on the charged starting material was 86%.

By the way, the maximum pH value of the reaction system at the initial stage of the reaction was 5.91. As the reaction proceeded, the pH was decreased, and reached 3.45 after approximately 2 hours.

Comparative Example 1

The production was conducted in the same manner as in Example 1 except that the pH of the reaction solvent before starting the reaction was 2.04 and the stirring rate in the reaction was 200 rpm. The maximum pH value of the reaction system at the initial stage of the reaction was 6.90. As the reaction proceeded, the pH value was decreased, and reached 3.90 after approximately 2 hours. The resulting basic copper nitrate was a bluish green spherical agglomerate of 5 to 30 μm in which fine plate crystals having a diameter of 0.5 to 5.0 μm were agglomerated. The yield based on the charged starting material was 97%.

Comparative Example 2

The production was conducted in the same manner as in Example 1 except that the pH of the reaction solvent before starting the reaction was 0.05, the stirring rate was 100 rpm and the reaction time was 20 hours. The maximum pH value of the reaction system at the initial stage of the reaction was only 4.06. As the reaction proceeded, the pH was decreased, and reached 3.79 after approximately 2 hours. The resulting basic copper nitrate was a non-uniform agglomerate of bluish green plate crystals, and the diameter of the plate crystals was 0.1 to 1.0 μm. The yield based on the charged starting material was 99%.

Comparative Example 3

The production was conducted in the same manner as in Example 1 except that the concentration of the copper nitrate aqueous solution was 70% by weight. However, since the copper nitrate crystals in the copper nitrate aqueous solution were precipitated, it could not quantitatively be charged into the reaction vessel, and the pH was increased to exceed 8. Thus, no desired basic copper nitrate was obtained.

Comparative Example 4

The production was conducted under the same conditions as in Example 1 except that the concentration of ammonium nitrate in the reaction solvent was 50% by weight. However, since excess ammonia generated in the reaction solution was coordinated in a copper ion and stabilized as a complex ion as such in a bluish green solution, the pH was increased to exceed 11. Consequently, a desired basic copper nitrate was little obtained.

Comparative Example 5

The production was conducted in the same manner as in Example 1 except that the concentration of sodium hydroxide was 70% by weight. However, since crystals of sodium hydroxide were precipitated, it could not quantitatively be charged into the reaction vessel, the PH was increased not to exceed 5 and no desired basic copper nitrate was obtained.

Comparative Example 6

The production was conducted in the same manner as in Example 1 except that the addition rate of the mixed solution was 0.1 ml/min and the addition rate of the sodium hydroxide aqueous solution was 1.8 ml/min. However, the pH was abruptly increased to 11 or more and was not decreased, and a large amount of gel-like copper hydroxide was precipitated which made it impossible to continue the stirring. Thus, the production was interrupted.

Comparative Example 7

The production was conducted in the same manner as in Example 1 except that nitric acid was not added to the reaction solvent in the reaction vessel and the pH at 20° C. was 5.6. However, the pH was abruptly increased to 8 or more and was not decreased, and a large amount of gel-like copper hydroxide was precipitated which made it impossible to continue the stirring. Thus, the production was interrupted.

TABLE 1

| | Primary particle diameter (μm) | Agglomeration | Form | Color of crystals | Burning rate (mm/sec) |
|---|---|---|---|---|---|
| Ex. 1 | 0.5-3.0 | weak agglomeration | prisms | bluish green | 10.2 |
| Ex. 2 | 0.5-3.0 | weak agglomeration | prisms | bluish green | 10.6 |
| Ex. 3 | 0.5-3.0 | weak agglomeration | prisms | bluish green | 10.4 |
| Ex. 4 | 0.5-3.0 | weak agglomeration | prisms | bluish green | 10.1 |
| Ex. 5 | 1.0-3.0 | no agglomeration | prisms | bluish green | 9.1 |
| Ex. 6 | 0.5-2.0 | weak agglomeration | prisms | bluish green | 10.1 |
| Ex. 7 | 1.0-3.0 | no agglomeration | prisms | bluish green | 10.0 |
| Comp. Ex. 1 | 0.5-5.0 | spherical agglomerate | — | bluish green | 8.0 |
| Comp. Ex. 2 | 0.1-1.0 | non-uniform agglomerate | — | bluish green | 5.5 |

As is apparent from Table 1, the basic copper nitrates obtained in Examples 1 to 7 have the particle diameters and the particle size distributions in the appropriate ranges. When these are used as an oxidizing agent, the burning rates of the gas generating agents can be adjusted to the preferable ranges.

The invention claimed is:

1. A process for producing a basic copper nitrate, which comprises adding an aqueous solution of copper nitrate or an aqueous solution of a mixture of copper nitrate and ammonium nitrate and an aqueous solution of sodium hydroxide to a reaction vessel in which a reaction solvent, whose pH at 20° C before starting the reaction is adjusted to between 1.5 and 2.5, is present, and conducting the reaction with stirring through a stirring unit so that the maximum pH value reaches 5.0 to 6.5 during the reaction.

2. The process for producing the basic copper nitrate according to claim 1, in which the concentration of the copper nitrate in the aqueous solution of copper nitrate or the aqueous solution of the mixture of copper nitrate and ammonium nitrate is 65% by weight or less.

3. The process for producing the basic copper nitrate according to claim 1, in which the concentration of ammonium nitrate in the aqueous solution of the mixture of copper nitrate and ammonium nitrate is 5% by weight or less.

4. The process for producing the basic copper nitrate according to claim 1, in which the concentration of the sodium hydroxide solution is 60% by weight or less.

5. The process for producing the basic copper nitrate according to claim 1, in which the reaction solvent is an acid aqueous solution or an aqueous solution of a mixture of an acid and a water-soluble additive.

6. The process for producing the basic copper nitrate according to claim 5, in which the acid is nitric acid.

7. The process for producing the basic copper nitrate according to claim 5, in which the concentration of the water-soluble additive in the reaction solvent is 5% by weight or less.

8. The process for producing the basic copper nitrate according to claim 1, in which a ratio $S_1/S_2$ of an addition rate Si (mo 1 /min) of the copper nitrate to an addition rate $S_2$ (mol/min) of the sodium hydroxide alkali is 0.2 to 3.0.

9. The process for producing the basic copper nitrate according to claim 1, in which the reaction temperature is 60° C or less.

10. The process for producing the basic copper nitrate according to claim 1, in which the stirring rate with the stirring unit in the reaction is less than 200 rpm.

11. The process for producing the basic copper nitrate according to claim 1, in which a position where the aqueous solution of copper nitrate or the aqueous solution of the mixture of copper nitrate and ammonium hydroxide and the sodium hydroxide solution is added is in the vicinity of or next to the stirring unit in the solution.

12. A basic copper nitrate having the form of prism which is produced in accordance with the process which comprises adding an aqueous solution of a copper nitrate or an aqueous solution of a mixture of a copper nitrate and a water-soluble additive and an aqueous solution of an alkali to a reaction vessel in which a reaction solvent is present, wherein the pH at 20° C of the reaction solvent before starting the reaction is adjusted to between 1.5 and 2.5, and conducting the reaction with stirring through a stirring unit so that the maximum pH value reaches 5.0 to 6.5 during the reaction, thereby precipitating a basic copper metal nitrate particulate product having the form of prisms.

* * * * *